US008897244B2

(12) United States Patent
Gilder

(10) Patent No.: US 8,897,244 B2
(45) Date of Patent: Nov. 25, 2014

(54) VIRAL QUALITY OF SERVICE UPGRADE

(75) Inventor: Nathaniel A. Gilder, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/580,648

(22) PCT Filed: Dec. 28, 2010

(86) PCT No.: PCT/US2010/062248
§ 371 (c)(1),
(2), (4) Date: Aug. 22, 2012

(87) PCT Pub. No.: WO2012/091698
PCT Pub. Date: Jul. 5, 2012

(65) Prior Publication Data
US 2012/0314677 A1 Dec. 13, 2012

(51) Int. Cl.
*H04W 4/00* (2009.01)
*H04L 12/851* (2013.01)
*H04L 12/721* (2013.01)

(52) U.S. Cl.
CPC ............ *H04L 47/2433* (2013.01); *H04L 45/38* (2013.01)
USPC ...... 370/329; 370/389; 370/394; 370/395.42; 370/412; 370/429

(58) Field of Classification Search
None
See application file for complete search history.

(56) References Cited

U.S. PATENT DOCUMENTS 7,299,032 B2 * 11/2007 Yamada et al. ............ 455/412.1
7,742,406 B1    6/2010 Muppala
8,271,631 B1 *  9/2012 Horvitz et al. ................ 709/223
2001/0007560 A1  7/2001 Masuda
2004/0064582 A1  4/2004 Raghunath et al.
2007/0097926 A1  5/2007 Liu et al.
2007/0201481 A1  8/2007 Bhatia
2008/0301250 A1 * 12/2008 Hardy et al. .................. 709/207
2009/0225746 A1  9/2009 Jackson et al.

FOREIGN PATENT DOCUMENTS

JP      2005278028 A    10/2005
WO   PCT/US10/62248     7/2012
WO   PCT/US10/66248     7/2012

OTHER PUBLICATIONS

International Searching Authority, International Search Report and Written Opinion of the International Searching Authority for PCT/US10/62248, Mar. 29, 2011.
Wikipedia; MultiProtocol Label Switching; Internet article (PDF); http//en.wikipedia.org/wiki/Multiprotocol_Label_Switching; Aug. 15, 2012; pgs.
J. Heinanen et al.; Assured Forwarding PHB Group; Network Working Group RFC 2597; Jun. 1999; 12 pgs.; The Internet Society; US.
Information Sciences Institute; DARPA Internet Program Protocol Specification; Report RFC 791; Sep. 1981; pgs; Information Sciences Institute, University of Southern California; US.

(Continued)

*Primary Examiner* — Willie J Daniel, Jr.
(74) *Attorney, Agent, or Firm* — Jensen & Puntigam, PS

(57) ABSTRACT

Methods, devices, and/or systems related to viral quality of service upgrade are disclosed. Viral quality of service upgrade allows upgrade of communications that are responsive to a priority communication, using an architecture in which the priority communication "infects" devices forwarding the priority communication, so that the forwarding devices may subsequently upgrade priority levels of communications responsive to the priority communication.

13 Claims, 7 Drawing Sheets

(56) References Cited

OTHER PUBLICATIONS

P. Almquist; Type of Service in the Internet Protocol Suite; Network Working Group RFC 1349; Jul. 1992; 29 pgs; US.
Braden, R. et al., "Integrated Services in the Internet Architecture: an Overview," Network Working Group, Request for Comments: 1633, Jul. 1994, pp. 1-28.
Deering, S and Hinden, R., "Internet Protocol, Version 6 (IPv6)," Network Working Group, Request for Comments: 2460, Dec. 1998, pp. 1-39.
International Searching Authority, International Search Report and Written Opinion of the International Searching Authority for PCT/US10/66248, Mar. 29, 2011.
Wikipedia; Differentiated Services; Internet article (PDF); http://en.wikipedia.org/wiki/Diffserv; Aug. 15, 2012; 7 pgs.
Wikipedia; Integrated Services; Internet article (PDF); http//en.wikipedia.org/wiki/Intserv; Aug. 15, 2012; 3 pgs.
Wikipedia; IPV4; Internet article (PDF); http//en.wikipedia.org/wiki/IPv4; Aug. 15, 2012; 12 pgs.
Wikipedia; Mobile IP; Internet article (PDF); http//en.wikipedia.org/wiki/IPv6; Aug. 15, 2012; 4 pgs.
Wikipedia; 4G; Internet article (PDF); http//en.wikipedia.org/wiki/4G; Aug. 15, 2012; 18 pgs.
Wikipedia; MultiProtocol Label Switching; Internet article (PDF); http//en.wikipedia.org/wiki/Multiprotocol_Label_Switching; Aug. 15, 2012; 7 pgs.
Wikipedia; Resource Reservation Protocol; Internet article (PDF); http//en.wikipedia.org/wiki/Resource_Reservation_Protocol; Aug. 15, 2012; 5 pgs.
Kelly; Quality of Service in Internet Protocol (IP) Networks; ICIA publication; 2002; 5 pgs.
K. Nichols et al.; Definition of the Differentiated Services field (DS Field) in the IPv4 and IPv6 Headers; Network Working Group RFC 2474; Dec. 1998; 21 pgs; The Internet Society; US.
S. Blake et al.; An Architecture for Differentiated Services; Network Working Group RFC 2475; Dec. 1998; 37 pgs. The Internet Society; US.
J. Heinanen et al; Assured Forwarding PHB Group; Network Working Group RFC 2597; Jun. 1999; 12 pgs.; The Internet Society; US.
D. Black et al.; Per Hop Behavior Identification Codes; Network Working Group RFC 3140; Jun. 2001; 9 pgs.; The Internet Society; US.
B. Davie et al; An Expedited Forwarding PHB (Per-Hop Behavior); Network Working Group RFC 3246; Mar. 2002; 17 pgs.; The Internet Society; US.
Information Sciences Institute; DARPA Internet Program Protocol Specification; Report RFC 791; Sep. 1981; 52 pgs; Information Sciences Institute, University of Southern California; US.
P. Almquist; Type of Service in the Internet Protocol Suite; Network Working Group RFC 1349; Jul. 1992; 29 pgs.
Telecom Italia; IPv6 Header Format; Web page; http://www.ngnet.it/e/ipv6proto/ipv6-proto-1.php; 2 pgs.
J. Babiarz et al.; Configuration Guidelines for DiffServ Service Classes; Network Working Group RFC 4594; Aug. 2006; The Internet Society; US.
Kelly; Quality of Service in Internet Protocol (IP) Networks; ICIA publication; Jun. 2002; 5 pgs.
D. Grossman; New Terminology and Clarification for Diffserv; Network Working Group RFC 3260; Apr. 2002; 11 pgs.; The Internet Society; US.
Telecom Italia; IPv6 Header Format; Web page; http://www.ngnet.it/e/ipv6proto/ipv6-proto-1.php; 2 pgs, accessed Jun. 2010.

\* cited by examiner

VIRAL QUALITY OF SERVICE UPGRADE

CROSS-REFERENCE TO RELATED APPLICATIONS

Priority is claimed to PCT Application PCT/US10/62248, entitled "VIRAL QUALITY OF SERVICE UPGRADE", filed on Dec. 28, 2010.

BACKGROUND

Unless otherwise indicated herein, the materials described in this section are not prior art to the claims in this application and are not admitted to be prior art by inclusion in this section.

As the use of mobile services grows, network capacity will become increasingly constrained, especially during peak times. Some mobile subscribers will likely be willing to pay more for enhanced service quality, while other subscribers might be willing to accept some service degradation for lower prices. Differentiated Quality of Service (QoS) methods could help service providers, such as mobile operators, better match service levels with their customers' expectations.

The DiffSery architecture (as described in RFC 2474; RFC 2475; RFC 2597; RFC 3140; RFC 3246; RFC 3260; and RFC 4594) allows for IP packet prioritization, so that delivery of IP packets originating from high-priority end points may be prioritized over those from lower-priority end points. The DiffServ architecture provides a class-based mechanism for traffic management which has relatively low network overhead; however DiffServ does not give high-priority end points the full benefit of their priority when communicating with low-priority end points. This is because while high priority IP packets may be prioritized for rapid & high quality delivery from the high-priority end point to the low-priority end point, low priority IP packets may be delivered more slowly and with higher error in the reverse direction, resulting in overall poor QoS for the high-priority end point in some situations.

In contrast to Diffserv, Integrated Services (IntServ), as described in RFC 1633, provides a flow-based mechanism for traffic management, which strives to guarantee QoS for designated data flows, e.g., communications back and forth between two end points. However, IntServ is expensive to deploy within a communications network in terms of network overhead.

SUMMARY

The present disclosure describes methods and devices for viral quality of service upgrade. Some example devices may comprise a router configured to perform viral upgrade of a priority level of responsive Internet Protocol (IP) communications, responsive to an initial priority IP communication. The router may comprise a plurality of forwarding queues associated with a plurality of different priority levels, wherein the router is configured to determine priority levels of IP packets forwarded by the router, and to place the IP packets in corresponding forwarding queues. The router may further comprise a viral upgrade module configured to identify whether an initial priority IP communication is flagged for viral upgrade of a priority level of responsive IP communications. The router may further comprise a data structure configured to log information comprising flow information from the initial priority IP communication, and viral upgrade priority level information. The flow information may be configured to determine responsive IP communications; and the viral upgrade priority level information may be configured to determine a viral upgrade priority level for the responsive IP communications. The viral upgrade module may be configured to assign a priority level for responsive IP communications using the flow information and the viral upgrade priority level logged in the data structure, by matching flow information from the responsive IP communications to flow information in the data structure, and assigning the viral upgrade priority level from the data structure to the responsive IP communications, so that the router places the responsive IP communications in a priority forwarding queue corresponding to the priority level of the viral upgrade priority level. The viral upgrade module may be configured to identify whether an initial priority IP communication is flagged for viral upgrade of a priority level of responsive IP communications by checking a designated viral upgrade bit in an IP packet header of the initial priority IP communication. The viral upgrade module may be configured to identify whether an IP communication is a responsive IP communication by identifying whether the IP communication is flagged for response-based upgrade, for example by checking a designated response upgrade bit in an IP packet header of the IP communication.

Some example devices may comprise a computing device configured to send and receive IP packets as an end point in a communications network, the computing device comprising an end point viral upgrade module configured to identify whether a received priority IP communication is flagged for viral upgrade of a priority level of responsive IP communications, and to flag IP communications responsive to the received priority IP communication for response-based upgrade. The end point viral upgrade module may be configured to identify whether a received priority IP communication is flagged for viral upgrade of a priority level of responsive IP communications by checking a designated viral upgrade bit in an IP packet header of the received priority IP communication. Also, the end point viral upgrade module may be configured to flag IP communications responsive to the received priority IP communication for response-based upgrade by setting a designated response upgrade bit in an IP packet header of the responsive IP communications.

Some example methods may be configured to perform viral upgrade of a priority level of responsive IP communications, responsive to an initial priority IP communication, and may comprise identifying whether an initial priority IP communication is flagged for viral upgrade of a priority level of responsive IP communications; logging flow information from the initial priority IP communication in a data structure, the flow information configured to determine responsive IP communications; logging viral upgrade priority level information in the data structure, the viral upgrade priority level configured to determine a viral upgrade priority level for the responsive IP communications; identifying a responsive IP communication flagged for response-based upgrade; assigning a priority level to the responsive IP communication using the flow information and the viral upgrade priority level logged in the data structure, by matching flow information from the responsive IP communications to flow information in the data structure, and assigning the viral upgrade priority level from the data structure to the responsive IP communication; and/or placing the responsive IP communication in a router priority forwarding queue corresponding to the priority level of the viral upgrade priority level. Identifying whether the initial priority IP communication is flagged for viral upgrade of a priority level of responsive IP communications may comprise checking a designated viral upgrade bit in an IP packet header of the initial priority IP communication. Also, identifying whether the IP communication is flagged for response-based upgrade may comprise checking a designated response upgrade bit in an IP packet header of the IP communication.

Some example methods may be configured to enable a communications network to perform viral upgrade of priority levels of Internet Protocol (IP) communications, and may comprise provisioning a priority end point device in the communications network to set a viral upgrade flag in IP communications originating from the priority end point device; provisioning an end point device in the communications network to set a response-based upgrade flag in responsive IP communications, responsive to the IP communications originating from the priority end point device; and provisioning a router in the communications network to identify the responsive IP communications flagged for response-based upgrade, to assign a priority level to the responsive IP communications to a viral upgrade priority level associated with the priority end point device, and to place the responsive IP communications in a router priority forwarding queue corresponding to the viral upgrade priority level. Provisioning the priority end point device in the communications network may comprise activating an end point viral upgrade module within the priority end point device, which may for example provision the priority end point device to set a designated viral upgrade bit in an IP packet header of IP communications originating from the priority end point device. Provisioning the end point device in the communications network to set a response-based upgrade flag in responsive IP communications may comprise provisioning the end point device with an end point viral upgrade module configured to identify whether a designated viral upgrade bit is set in an IP packet header of a received IP communication. When the designated viral upgrade bit is set, the end point viral upgrade module may flag IP communications responsive to the received IP communication for response-based upgrade by setting a designated response upgrade bit in an IP packet header of the responsive IP communications. The router in the communications network may also be provisioned to identify whether an initial priority IP communication is flagged for viral upgrade of a priority level of responsive IP communications; to log flow information from the initial priority IP communication in a data structure, the flow information configured to determine responsive IP communications; and/or to log viral upgrade priority level information in the data structure, the viral upgrade priority level configured to determine a viral upgrade priority level for the responsive IP communications.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
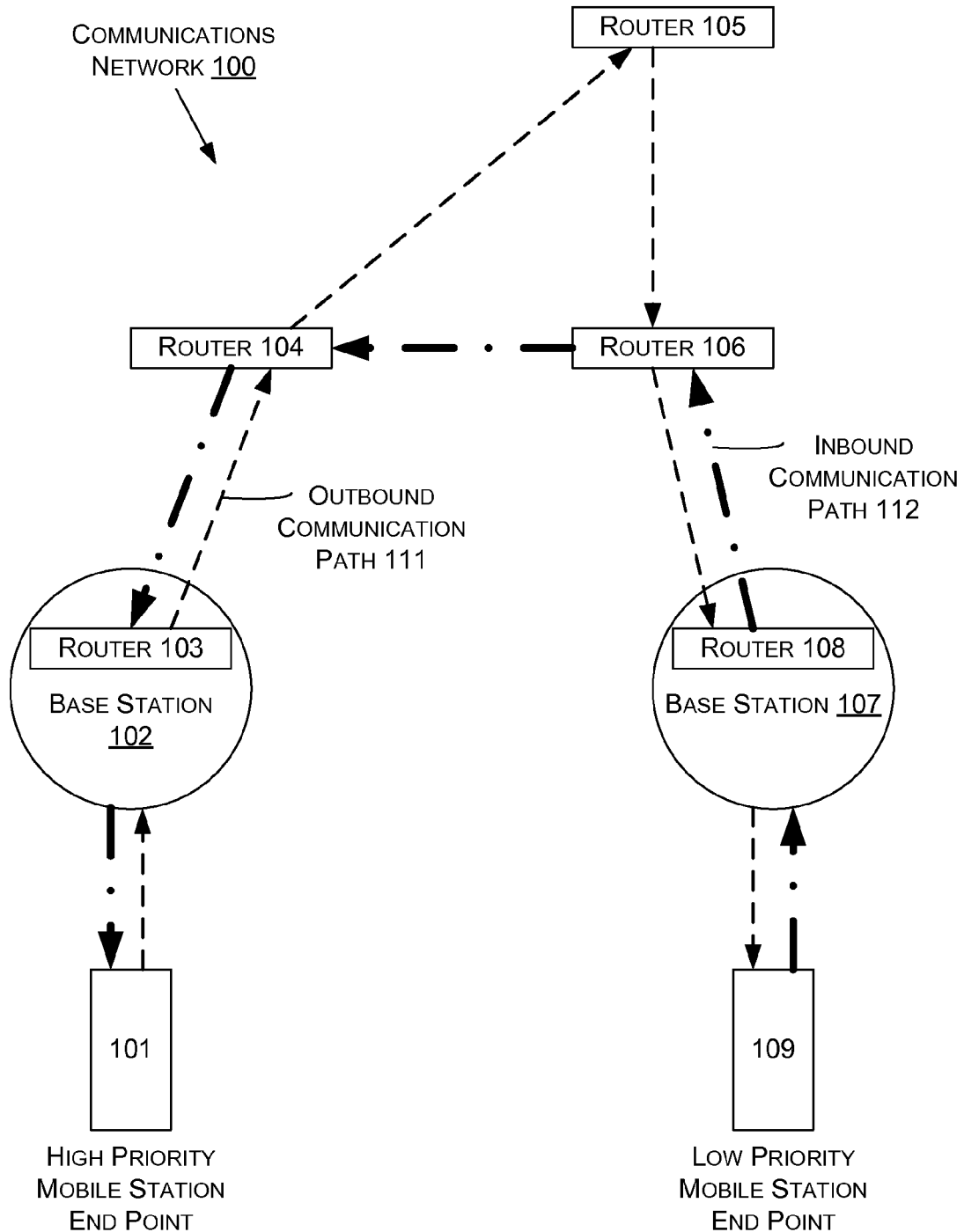
FIG. 1 is a diagram illustrating an example communications network configured to implement viral QoS upgrade.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to methods, devices, and/or systems related to viral quality of service upgrade. Viral quality of service upgrade allows upgrade of communications that are responsive to a priority communication, using an architecture in which the priority communication "infects" devices forwarding the priority communication, so that the forwarding devices may subsequently upgrade priority levels of communications responsive to the priority communication. In some embodiments, viral quality of service upgrade provides a relatively low-overhead approach to support differentiated QoS, while simultaneously supporting QoS for communication flows, without the network overhead associated with guaranteeing end-to-end QoS for communication flows.

FIG. 1 is a diagram illustrating an example communications network 100 configured to implement viral QoS upgrade in accordance with at least some embodiments of the present disclosure. FIG. 1 includes high priority mobile station end point 101, base station 102 including router 103, router 104, router 105, router 106, base station 107 including router 108, and low priority mobile station end point 109. An outbound communication path 111 originates at high priority mobile station end point 101, travels through base station 102 and router 103, router 104, router 105, router 106, base station 107 and router 108, and terminates at low priority mobile station end point 109. An inbound communication path 112 originates at low priority mobile station end point 109, travels through base station 107 and router 108, router 106, router 104, base station 102 and router 103, and terminates at low priority mobile station end point 101. In FIG. 1, the components along communication path 111 and communication path 112 are coupled by wired or wireless communications connections allowing transmission of communications data from one component to the next.

In FIG. 1, the high priority mobile station end point 101 may for example be configured to flag communications originating from the end point 101 as priority communications entitled to viral upgrade of responsive communications, and to send the priority communications to the low priority mobile station end point 109 via communications network 100. Communications network 100 receives the priority communications at base station 102, and forwards the priority communications along the outbound communication path 111 to the low priority mobile station end point 109. Each of the routers 103, 104, 105, 106 and 108 in the communication path 111 may be configured to appropriately prioritize QoS of the priority communications, to identify that the priority communications are entitled to viral upgrade of responsive communications, and to log information allowing the routers to subsequently identify and prioritize responsive communications. Low priority mobile station end point 109 may be configured to identify that the priority communications are entitled to viral upgrade of responsive communications, to flag communications responsive to the received priority communications for response-based upgrade, and to send the responsive communications to the high priority mobile station end point 101 via communications network 100. Communications network 100 may be configured to receive the responsive communications at base station 107, and forward the responsive communications along the inbound communication path 112 to the high priority mobile station end point 101. Each of the routers 108, 106, 104, and 103 in the communication path 112 may be configured to identify that the responsive communications are entitled to response-based upgrade, and to upgrade the QoS priority level of the responsive communications to the level to which the priority communications are entitled to viral upgrade.

In some embodiments, inbound communications path 112 may pass through only routers that are within the outbound communications path 111, as shown in FIG. 1. In this case, all of the routers in the communications path 112 may perform viral upgrade and thereby enhance the priority level of responsive communications. In some embodiments, inbound communications path 112 may pass through routers that not within the outbound communications path 111, or otherwise not configured to perform viral upgrade as described herein. In this case, some of the routers in the communications path 112 may not perform viral upgrade and may not enhance the priority level of responsive communications. Nonetheless, the collective action of those routers that are in the outbound communications path 111, and therefore perform viral upgrade of responsive communications, may be sufficient to adequately ensure enhanced QoS for responsive communications.

Figure 2:
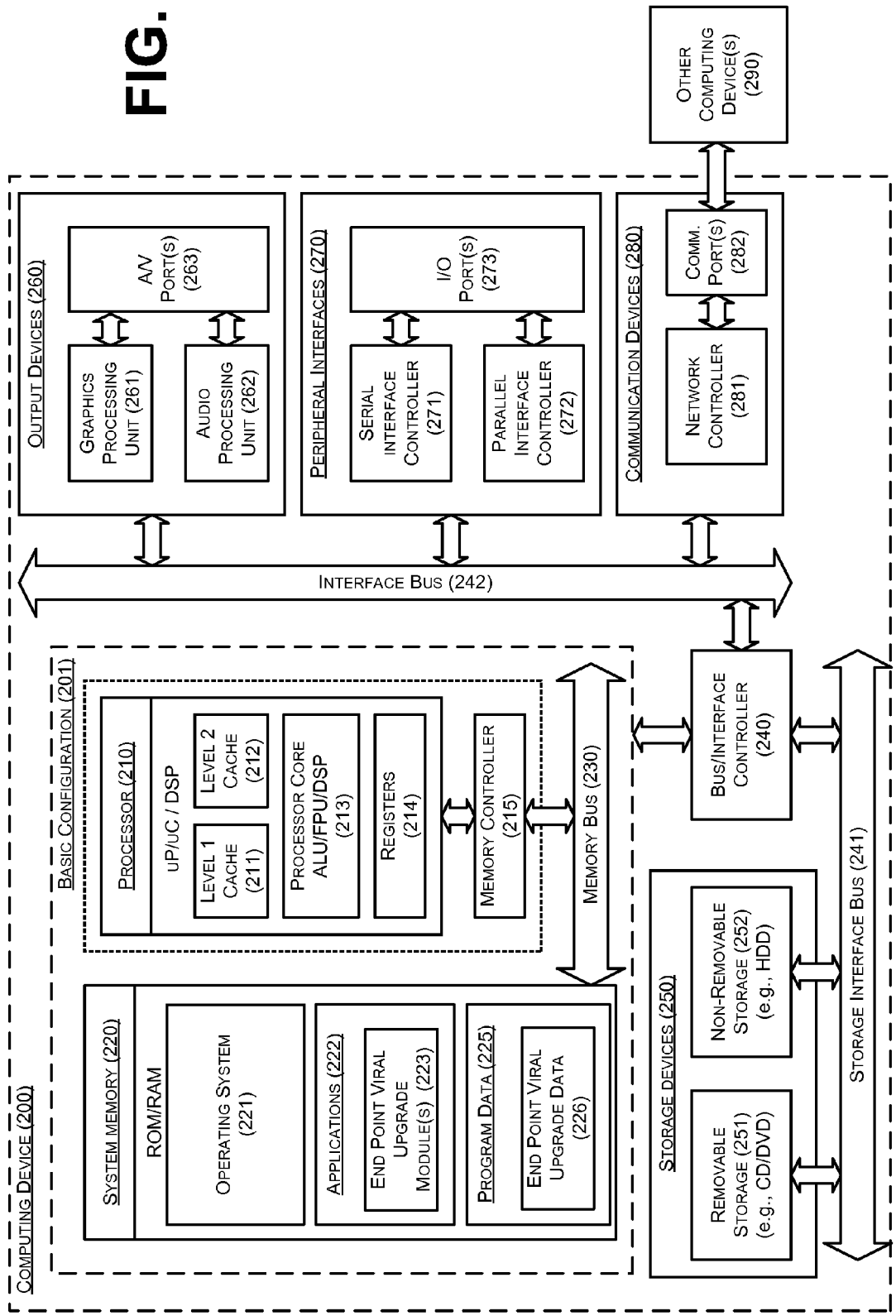
FIG. 2 is a block diagram illustrating a computing device as one example of an end point.

FIG. 2 is a block diagram of a computing device 200 as one example of an end point, arranged in accordance with at least some embodiments of the present disclosure. Computing device 200 may be implemented as a portion of a small-form factor portable (or mobile) electronic device such as a mobile phone. Computing device 200 may also be implemented as a personal computer including both laptop computer and non-laptop computer configurations. In a very basic configuration 201, computing device 200 may include one or more processors 210 and system memory 220. A memory bus 230 may be used for communicating between the processor 210 and the system memory 220.

Depending on the desired configuration, processor 210 may be of any type including but not limited to a microprocessor (µP), a microcontroller (µC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. Applications 222 may include, for example, end point viral upgrade module(s) 223. Program data 225 may include end point viral upgrade data 226 that may be used by modules 223. In some embodiments, end point viral upgrade module(s) 223 may be located in the operating system 221 or in the communication device(s) 280 as will be appreciated.

When the computing device 200 serves as a high priority end point that is entitled to viral upgrade privileges, such as the high priority mobile station end point 101 illustrated in FIG. 1, end point viral upgrade module(s) 223 may be configured to set a viral upgrade flag in IP communications originating from the priority end point device. For example, the end point viral upgrade module(s) 223 may be configured to flag outbound IP communications as priority IP communications entitled to viral upgrade by setting a designated viral upgrade bit in an IP packet header of the outbound IP communications. In some embodiments, the designated viral upgrade bit may comprise one or more bits within a differentiated services field of an IP header. In some embodiments, end point viral upgrade module(s) 223 may be activated and/or deactivated based on provisioning instructions received at the device 200. For example, the module(s) 223 may be activated to set a viral upgrade flags in outgoing communications after a subscriber adds viral upgrade service to a mobile communications plan, and may be deactivated (to stop setting a viral upgrade flags) when a subscriber removes viral upgrade service from a mobile communications plan.

When the computing device 200 serves as any end point, such as the high priority mobile station end point 101 and/or the low priority mobile station end point 109 illustrated in FIG. 1, the end point viral upgrade module(s) 223 may be configured to identify whether a received priority IP communication is flagged for viral upgrade of a priority level of responsive IP communications, and to flag IP communications responsive to the received priority IP communication for response-based upgrade. The end point viral upgrade module(s) 223 may for example be configured to identify whether a received priority IP communication is flagged for viral upgrade of a priority level of responsive IP communications by checking a designated viral upgrade bit in an IP packet header of the received priority IP communication. The end point viral upgrade module(s) 223 may for example be configured to flag IP communications responsive to the received priority IP communication for response-based upgrade by setting a designated response upgrade bit in an IP packet header of the responsive IP communications, e.g. one or more bits within the Differentiated Services field of an IP header, which may be different bits from those used to flag the initial priority communications.

In some embodiments, the end point viral upgrade module(s) 223 or portions thereof, namely those portions allowing high priority end points to set viral upgrade flags, may be configured for remote activation/provisioning as described above. For example, a subscriber not currently entitled to viral upgrade may wish to add viral upgrade as a feature for the subscriber's mobile communications plan. The network service provider may remotely activate the end point viral upgrade module(s) 223 within the subscriber's mobile phone to begin setting viral upgrade flags in outbound communications.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290, e.g., with a base station 107 and/or 102 as illustrated in FIG. 1, or with a server such as an Internet Service Provider (ISP) server, over a network communication via one or more communication ports 282.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Figure 3:
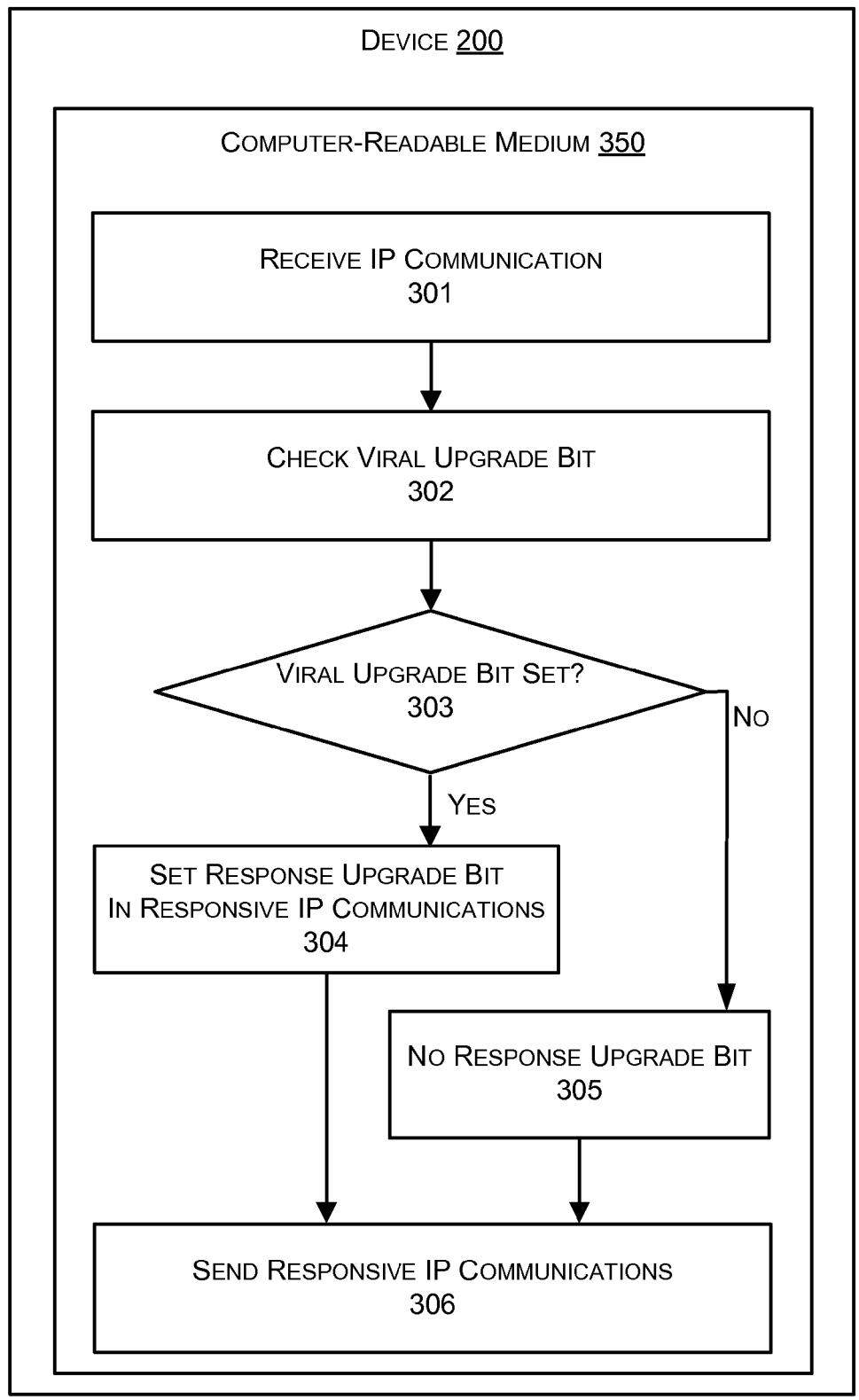
FIG. 3 is a flow diagram illustrating an example method that may be performed by an end point device.

FIG. 3 is a flow diagram illustrating an example method that may be performed by an end point device, arranged in accordance with at least some embodiments of the present disclosure. The example flow diagram may include one or more operations/modules as illustrated by blocks 301-306, which represent operations as may be performed in a method, functional modules in a device 200, and/or instructions as may be recorded on a computer readable medium 350. The illustrated blocks 301-306 may be arranged to provide functional operations including one or more of "Receive IP Communication" at block 301, "Check Viral Upgrade Bit" at block 302, "Viral Upgrade Bit Set?" at block 303, "Set Response Upgrade Bit In Responsive IP Communications" at block 304, "No Response Upgrade Bit" at block 305, and/or "Send Responsive IP Communications" at block 306.

In FIG. 3, blocks 301-303 are illustrated as being performed sequentially, blocks 304-305 are illustrated as alternatives for "Yes" and "No" results from block 303, respectively, and block 306 is illustrated as last in the sequence, regardless of which of blocks 304 or 305 are performed. It will be appreciated however that the blocks may be re-ordered as convenient to suit particular embodiments, and that the blocks or portions thereof may be performed concurrently in some embodiments. It will also be appreciated that in some examples various blocks may be eliminated, divided into additional blocks, and/or combined with other blocks.

FIG. 3 illustrates an example method by which a computing device, configured to send and receive IP packets as an end point in a communications network, may flag communications responsive to a communication that is flagged for viral upgrade, so that the responsive communications may be handled with increased priority level by the communications network.

In a "Receive IP Communication" block 301, an IP communication is received at the device 200. The IP communication may comprise one or more IP packets, each generally comprising a header and a payload. The header comprises a variety of information as specified in the applicable IP specification, e.g. IPv4, IPv6, or otherwise. Block 301 may be followed by block 302.

In a "Check Viral Upgrade Bit" block 302, one or more of the IP packet headers associated with the received IP communication may be checked for the state of a designated viral upgrade bit. For example, one or more of the bits in a differentiated services field of an IP header may be designated as a viral upgrade bit, and the designated bit may be checked. Block 302 may be followed by block 303.

In a "Viral Upgrade Bit Set?" block 303, the state of the one or more viral upgrade bits is determined. An end point viral upgrade module may be configured to identify whether a received priority IP communication is flagged for viral upgrade of a priority level of responsive IP communications. In some embodiments, the state of a viral upgrade bit may be either "Yes" or "No", where "Yes" indicates that the received IP communication has viral upgrade privilege, entitling responsive communications to response-based upgrade, and "No" indicates no viral upgrade privilege. In some embodiments, multiple viral upgrade bits may be used to provide further information, e.g., a priority level associated with the viral upgrade privilege and/or conditions which the device 200 must meet in order to take advantage of response-based upgrade. Block 303 may be followed by block 304 or block 305.

In a "Set Response Upgrade Bit In Responsive IP Communications" block 304, an end point viral upgrade module may be configured to flag IP communications responsive to the received priority IP communication for response-based upgrade. Block 304 may be performed in response to a "Yes" determination in block 303. To flag responsive IP communications, a designated response upgrade bit may be set in communications responsive to the received IP communication. In the case of multiple simultaneous communications being sent by a device, a determination of which IP communications are responsive to communications with viral upgrade privilege may be made. In some embodiments, this can be accomplished through data identifying destination addresses of end points having viral upgrade privilege. The response upgrade bit may be set for IP packets addressed to end points having viral upgrade privilege. To set the response upgrade bit, one or more designated bits in, for example, the differentiated services field of IP packet headers associated with the responsive communication may be set to a state that is predetermined to indicate that the IP packets are marked for response-based upgrade. Block 304 may be followed by block 306.

In a "No Response Upgrade Bit" block 305, in response to a "No" determination in block 303, a designated response upgrade bit may not be set in communications responsive to the received IP communication. For example, one or more bits in a differentiated services field of IP packet headers may be set to a state and/or allowed to remain in a state that is predetermined to indicate the IP packets are not entitled to response-based upgrade. Block 305 may be followed by block 306.

In a "Send Responsive IP Communications" block 306, the IP packets corresponding to the responsive communication may be sent to the communications network to be forwarded to their destination. The IP packets may optionally be treated with upgraded priority level by the communications network, depending on the state of the one or more viral upgrade bits.

The method of FIG. 3 need not be carried out in all embodiments. As explained herein, in some embodiments, devices such as routers within a communications network may be configured to identify responsive communications without the benefit of the response upgrade bit, by using information other than the response upgrade bit to identify responsive communications which are entitled to response-based upgrade. For example, all IP packet headers include source and destination identifiers, which may be used in some embodiments to identify responsive communications for response based upgrade.

Figure 4:
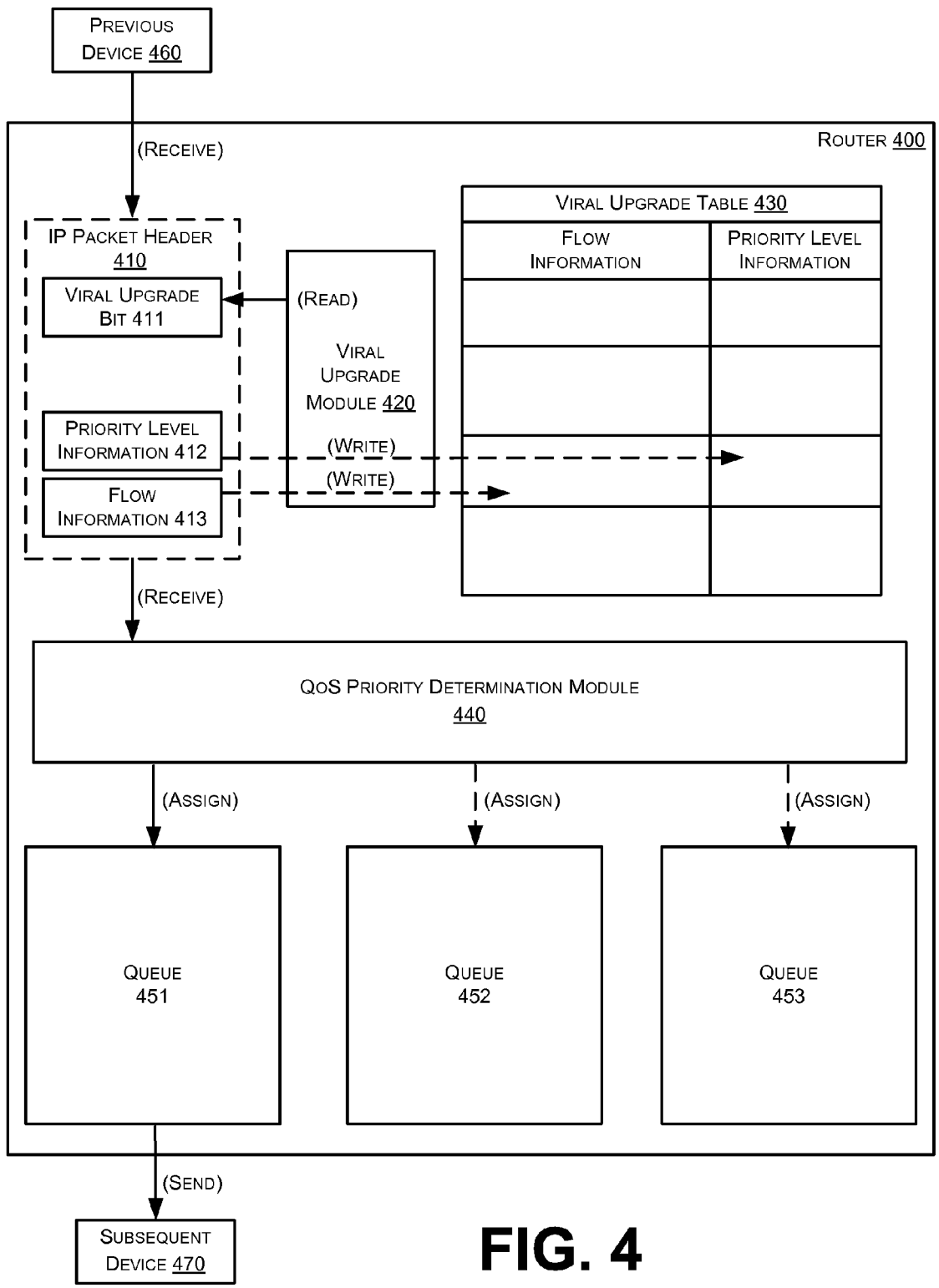
FIG. 4 is a diagram illustrating example operations of a communications network device, such as a router upon receiving an IP packet that is flagged for viral upgrade.

FIG. 4 is a diagram illustrating example operations of a communications network device 400, such as a router, upon receiving an IP packet that is flagged for viral upgrade, arranged in accordance with at least some embodiments of the present disclosure. FIG. 4 illustrates a previous device 460, a router 400, and a subsequent device 470. Router 400 comprises received IP packet header 410, viral upgrade module 420, viral upgrade table 430, QoS priority determination module 440, and forwarding queues 451, 452, and 453. IP packet header 410 comprises viral upgrade bit 411, priority level information 412, and flow information 413. Viral upgrade table 430 includes a flow information column and a priority level information column. Devices 460, 400, and 470 may in general comprise any components of a computing device 200 as illustrated in FIG. 2, and may be configured as routers or other devices in a communications network, with the addition of viral upgrade module 420 and viral upgrade table 430.

In general, FIG. 4 illustrates a router 400 that receives an IP packet and corresponding IP packet header 410 from a previous device 460 in a communications network. The router 400 may be configured to appropriately forward the IP packet to some subsequent device 470 in the communications network. The router may be configured to use priority level information 412 to place the IP packet in an appropriate forwarding queue 451, 452, or 453, for example by operation of the QoS priority determination module 440. The solid line to queue 451 indicates for example that the IP packet may be assigned to queue 451, while the dashed arrows to queues 452 and 453 indicate that QoS priority determination module 440 also has the option of assigning to queues 452 and 453 when appropriate. When the viral upgrade module 420 discovers an IP packet is flagged for viral upgrade, e.g. via reading a viral upgrade bit 411, the viral upgrade module 420 may log, or write, flow information and priority level information in the viral upgrade table 430, for later use in identifying and setting priority level of communications responsive to the communication associated with header 410.

More particularly, FIG. 4 provides a router 400 configured to perform viral upgrade of a priority level of responsive IP communications, responsive to an initial priority IP communication comprising IP packet header 410. The router 400 comprises a plurality of forwarding queues 441, 442, and 443 associated with a plurality of different priority levels, e.g., where queue 441 is associated with a highest QoS priority level, queue 442 is associated with a middle QoS priority level, and queue 443 is associated with a lowest QoS priority level. The router 400 is configured to determine priority levels of IP packets forwarded by the router 400, such as the packet associated with IP packet header 410, and to place the IP packets in corresponding forwarding queues. Assignment of IP packets to appropriate forwarding queues may be accomplished for example by QoS priority determination module 440. In some embodiments, viral upgrade module 420 may be included in the QoS priority determination module 440 as will be appreciated with the benefit of this disclosure.

The router 400 may further comprise a viral upgrade module 420 configured to identify whether an initial priority IP communication, e.g., a communication comprising IP packet header 410, is flagged for viral upgrade of a priority level of responsive IP communications, e.g., through the use of a designated viral upgrade bit set in the IP packet header 410. When the viral upgrade bit is set, the viral upgrade module 420 may be configured to responsively log flow information 413 and priority level information 412 in the viral upgrade table 430. The viral upgrade table 430 may comprise a data structure configured to log the flow information from the initial priority IP communication, e.g., the communication comprising IP packet header 410, and viral upgrade priority level information.

The flow information may comprise any information configured to determine responsive IP communications. In some embodiments, the flow information may comprise source and/or destination addresses from the IP packet header 410. In some embodiments, the flow information may comprise a flow label from the IP packet header 410. Available flow information may depend on which version of the Internet Protocol (IP) is implemented. For example, flow labels are not part of IP version 4 (IPv4) packet headers, so other information may be preferably relied upon in embodiments configured to operate with IPv4 packet headers. Flow labels are used for IP version 6 (IPv6) packet headers, which is predicted to become the predominant protocol in the near future, so flow labels may be an appropriate choice for flow information in embodiments configured to operate with IPv6 packet headers.

Viral upgrade priority level information may comprise any information configured to determine a viral upgrade priority level for the responsive IP communications. In some embodiments, the viral upgrade priority level information may comprise the priority level of the IP packet associated with IP packet header 410 of the initial priority IP communication. It is also possible that the viral upgrade priority level could be some different priority level, either specified in the IP packet header 410, or by the router 400, e.g., by the QoS priority determination module 440.

Figure 5:
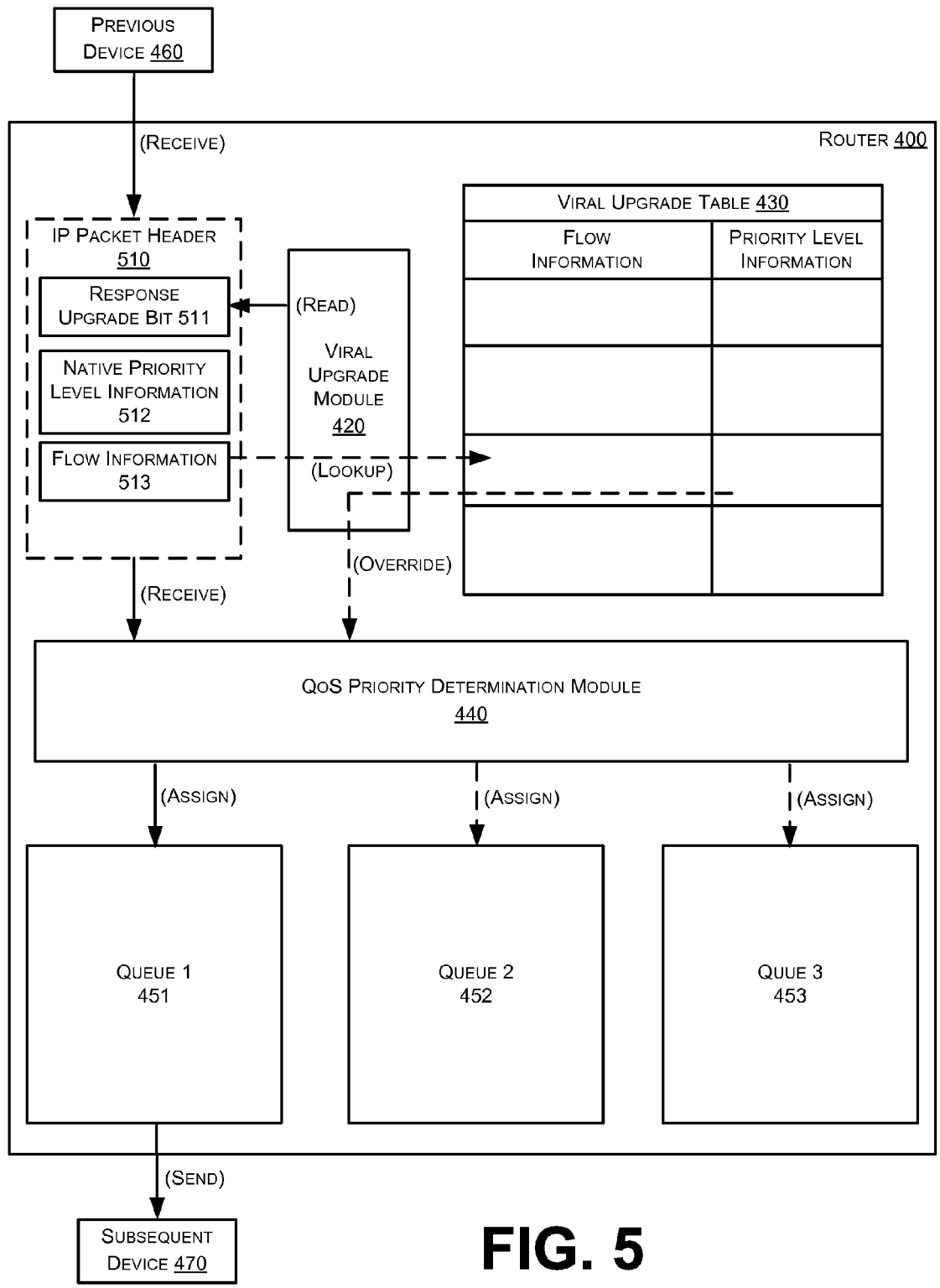
FIG. 5 is a diagram illustrating example operations of a communications network device, such as a router upon receiving an IP packet that is flagged for response-based upgrade.

FIG. 5 is a diagram illustrating example operations of a communications network device 400, such as a router, upon receiving an IP packet that is flagged for response-based upgrade, arranged in accordance with at least some embodiments of the present disclosure.

FIG. 5 illustrates the components of FIG. 4, with the exception of received IP packet header 410. In place of received IP packet header 410 is received IP packet header 510, comprising response upgrade bit 511, native priority level information 512, and flow information 513.

FIG. 5 illustrates the router 400 upon receiving an IP communication, including IP packet header 510, which is responsive to the communication including header 410. In some embodiments, the viral upgrade module 420 may be configured to identify whether an IP communication is a responsive IP communication by identifying whether the IP communication is flagged for response-based upgrade. This may be accomplished for example by checking, or reading, a designated response upgrade bit in an IP packet header 510 of the IP communication. When the response upgrade bit is set, the viral upgrade module 420 may be configured to assign a priority level for the responsive IP communication using the flow information and the viral upgrade priority level logged in the data structure represented by the viral upgrade table 430. The viral upgrade module 420 may be configured to match flow information from the responsive IP communication to flow information in the data structure. In some embodiments, the viral upgrade module 420 may look up the flow information 513 in the viral upgrade table 430. When the flow information 513 is found in the viral upgrade table 430, the corresponding priority level information may be used to override the priority level assignment that would otherwise be made in the QoS priority determination module 440. The router 400 may be configured to assign the viral upgrade priority level from the data structure 430 to the responsive IP communications, so that the router places the responsive IP communications in a priority forwarding queue, such as 451, corresponding to the priority level of the viral upgrade priority level.

In some embodiments, the viral upgrade table 430 may be configured to log a time of an initial priority IP communication, such as the communication comprising IP header 410, in addition to the flow information and viral upgrade priority level information. The router 400 may be configured to remove entries from the viral upgrade table 430 when the entries are older than a predetermined age. Removal of entries may keep the viral upgrade table 430 or other data structure small and thereby reduce overhead involved in table lookups. The router may be configured to assign a native priority level to IP communications which are flagged for response-based upgrade, but for which the data structure does not contain corresponding flow information.

In some embodiments, an architecture that does not require the use of response upgrade bits such as 511 may be employed. Instead, any information that identifies an IP packet as responsive to a previous IP communication may trigger a lookup of viral upgrade priority information in a data structure such as 430. For example, source and destination addresses of received IP packets may be checked against logged information from previously forwarded packets. Whenever there is a match of source address to previous destination address, and destination address to previous source address, corresponding logged priority level information from the previous IP packet may be used to implement a viral upgrade of the responsive packet. Flow label information may also be used to identify responsive IP packets, for IP packets implementing IPv6.

Figure 6:
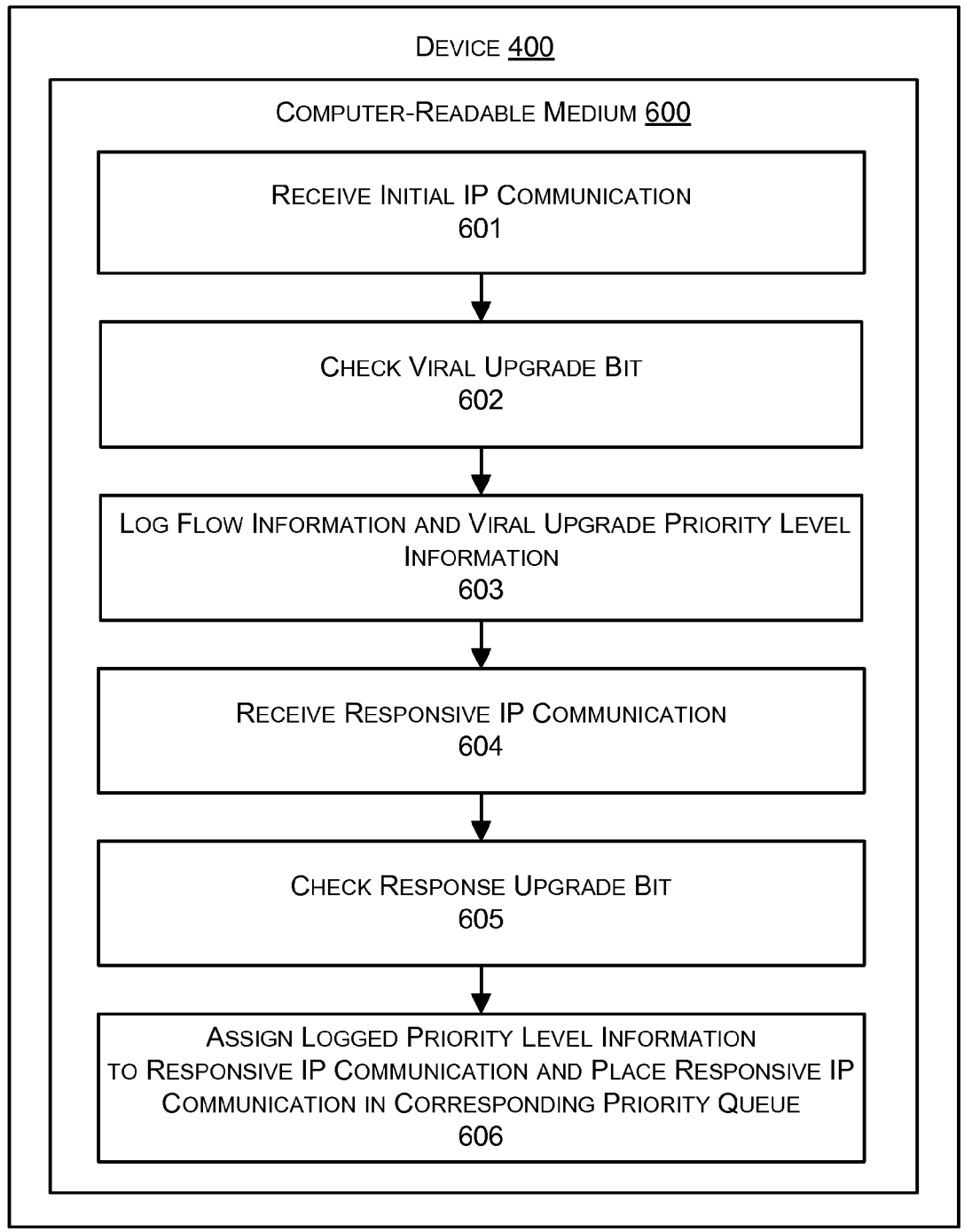
FIG. 6 is a flow diagram illustrating an example method that may be performed by a network communications device.

FIG. 6 is a flow diagram illustrating an example method that may be performed by a network communications device 400, arranged in accordance with at least some embodiments of the present disclosure. The example flow diagram may include one or more operations/modules as illustrated by blocks 601-606, which represent operations as may be performed in a method, functional modules in a device 400, and/or instructions as may be recorded on a computer readable medium 600. The illustrated blocks 601-606 may be arranged to provide functional operations including one or more of "Receive Initial IP Communication" at block 601, "Check Viral Upgrade Bit" at block 602, "Log Flow Information and Viral Upgrade Priority Level Information" at block 603, "Receive Responsive IP Communication" at block 604, "Check Response Upgrade Bit" at block 605, and/or "Assign Logged Priority Level Information to Responsive IP Communication and Place Responsive IP communication in Corresponding Priority Queue" at block 606.

In FIG. 6, blocks 601-606 are illustrated as being performed sequentially, with block 601 first and block 606 last. It will be appreciated however that these blocks may be re-ordered as convenient to suit particular embodiments, and that these blocks or portions thereof may be performed concurrently in some embodiments. It will also be appreciated that in some examples various blocks may be eliminated, divided into additional blocks, and/or combined with other blocks.

FIG. 6 illustrates an example method configured to perform viral upgrade of a priority level of responsive Internet Protocol (IP) communications, responsive to an initial priority IP communication.

In a "Receive Initial IP Communication" block 601, an initial IP communication comprising one or more IP packets may be received at device 400, such as the router illustrated in FIG. 4 and FIG. 5. Device 400 may be configured to forward the IP packets to a subsequent device at an appropriate QoS priority level, and may furthermore implement viral upgrade technologies for upgrading responsive communications as described herein. Block 601 may be followed by block 602.

In a "Check Viral Upgrade Bit" block 602, device 400 may be configured to identify whether the initial priority IP communication is flagged for viral upgrade of a priority level of responsive IP communications. Identifying whether the initial priority IP communication is flagged for viral upgrade of a priority level of responsive IP communications may comprise checking a designated viral upgrade bit in an IP packet header of the initial priority IP communication. In some embodiments, a designated viral upgrade bit may be checked for all received IP packets. When the designated viral upgrade bit is set, block 603 is performed. Otherwise, information from the received IP packet need not be logged. Block 602 may be followed by block 603.

In a "Log Flow Information and Viral Upgrade Priority Level Information" block 603, device 400 may be configured to log flow information from the initial priority IP communication in a data structure, the flow information configured to determine responsive IP communications, and to log viral upgrade priority level information in the data structure, the viral upgrade priority level configured to determine a viral upgrade priority level for the responsive IP communications. In some embodiments, the flow information may comprise one or more of a flow label, a source IP address in the initial priority IP communication, and a destination IP address in the initial priority IP communication. In some embodiments, the viral upgrade priority level information may comprise a priority level of the initial priority IP communication. In some embodiments, device 400 may be configured to also log a time of the initial priority IP communication, and to remove entries from the data structure when the entries are older than a predetermined age. This arrangement may prevent the data structure from becoming large. The size of the data structure may be managed for example by setting an appropriate policy for ageing and removal of entries. Tolerable size for the data structure may vary depending on processing power and cache sizes, with the goal of short lookup times. Block 603 may be followed by block 604.

In a "Receive Responsive IP Communication" block 604, a responsive IP communication comprising a one or more responsive IP packets may be received at device 400, at some time subsequent to receiving the initial IP communication. Device 400 may be configured to forward the responsive IP packets to a subsequent device at an appropriate QoS priority level, which may be determined by reference to the information logged in the data structure as described below. Block 604 may be followed by block 605.

In a "Check Response Upgrade Bit" block 605, device 400 may be configured to identify a responsive IP communication flagged for response-based upgrade. In some embodiments, identifying whether the IP communication is flagged for response-based upgrade may comprise checking a designated response upgrade bit in an IP packet header of the IP communication. A designated response upgrade bit may for example be checked for all incoming IP packets. When the designated response upgrade bit is set, block 606 may be performed. When the designated response upgrade bit is not set, the IP communication may be treated normally, e.g., without viral upgrade. Block 605 may be followed by block 606.

In a "Assign Logged Priority Level Information to Responsive IP Communication and Place Responsive IP communication in Corresponding Priority Queue" block 606, device 400 may be configured to assign a priority level to the responsive IP communication using the flow information and the viral upgrade priority level logged in the data structure, by matching flow information from the responsive IP communications to flow information in the data structure, and assigning the viral upgrade priority level from the data structure to the responsive IP communication. Device 400 may be configured to place the responsive IP communication in a router priority forwarding queue corresponding to the priority level of the viral upgrade priority level. In some embodiments, device 400 may be configured to assign a native priority level to an IP communication flagged for response-based upgrade, but for which the data structure does not contain corresponding flow information.

Figure 7:
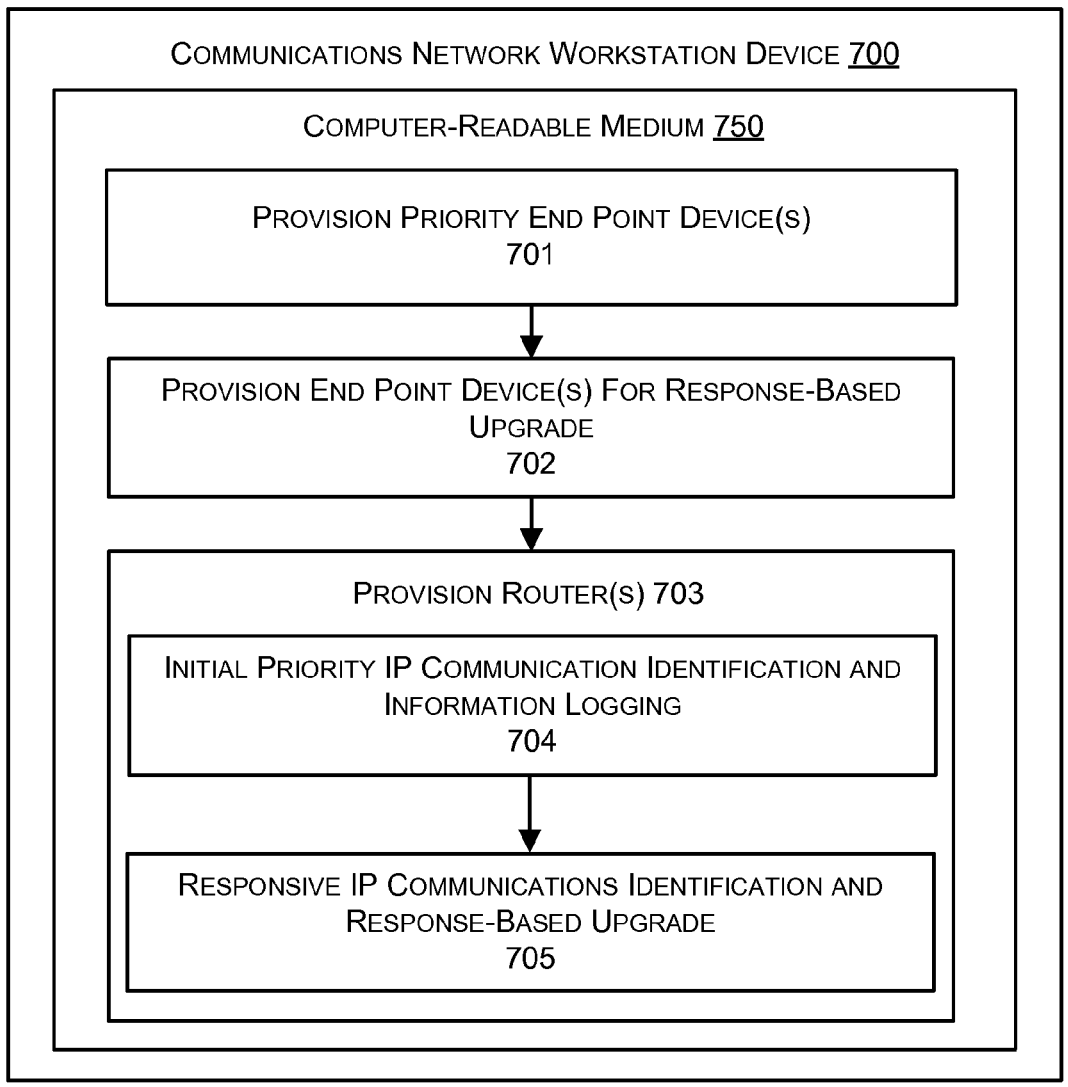
FIG. 7 is a flow diagram illustrating an example method that may be performed by a communications network workstation device; all arranged in accordance with at least some embodiments of the present disclosure.

FIG. 7 is a flow diagram illustrating an example method that may be performed by a communications network workstation device 700, arranged in accordance with at least some embodiments of the present disclosure. The example flow diagram may include one or more operations/modules as illustrated by blocks 701-705, which represent operations as may be performed in a method, functional modules in a network workstation device 700, and/or instructions as may be recorded on a computer readable medium 750. The illustrated blocks 701-705 may be arranged to provide functional operations including one or more of "Provision Priority End Point Device(s)" at block 701, "Provision End Point Devices for Response-Based Upgrade" at block 702, "Provision Router(s)" at block 703, "Initial Priority IP Communication Identification and Information Logging" at block 704, and/or "Responsive IP Communications Identification and Response-Based Upgrade" at block 705.

In FIG. 7, blocks 701-705 are illustrated as being performed sequentially, with block 701 first and block 705 last. It will be appreciated however that these blocks may be re-ordered as convenient to suit particular embodiments, and that these blocks or portions thereof may be performed concurrently in some embodiments. It will also be appreciated that in some examples various blocks may be eliminated, divided into additional blocks, and/or combined with other blocks.

FIG. 7 illustrates an example method by which a communications network may be enabled to perform viral upgrade of priority levels of IP communications. The communications network workstation device 700 may in general comprise elements of a computing device as illustrated in FIG. 2. The communications network workstation device 700 may be a workstation that is operated for example by a communications network technician to provision aspects of the communications network. In some embodiments, the communications network workstation device 700 may be interchangeable with a server configured to perform the various steps illustrated in FIG. 7 automatically.

In a "Provision Priority End Point Device(s)" block 701, device 700 may be configured to provision one or more priority end point devices in the communications network to set a viral upgrade flag in IP communications originating from the priority end point device. In general, provisioning a device in a communications network may comprise communicating appropriate data, certificates, and/or software to allow the device to perform the operations for which it is provisioned. In some embodiments, provisioning the priority end point device in the communications network may comprise provisioning the priority end point device to set a designated viral upgrade bit in an IP packet header of IP communications originating from the priority end point device. In some embodiments, provisioning the priority end point device in the communications network may comprise activating an end point viral upgrade module within the priority end point device, e.g., by remotely activating a viral upgrade feature of an endpoint viral upgrade module. Block 701 may be followed by block 702.

In a "Provision End Point Devices for Response-Based Upgrade" block 702, device 700 may be configured to provision one or more end point devices in the communications network to set a response-based upgrade flag in responsive IP communications, responsive to the IP communications originating from the priority end point device. In some embodiments, provisioning an end point device in the communications network to set a response-based upgrade flag in responsive IP communications may comprise provisioning the end point device with an end point viral upgrade module configured to identify whether a designated viral upgrade bit is set in an IP packet header of a received IP communication, and when the designated viral upgrade bit is set, to flag IP communications responsive to the received IP communication for response-based upgrade by setting a designated response upgrade bit in an IP packet header of the responsive IP communications. Block 702 may be followed by block 703.

In a "Provision Router(s)" block 703, device 700 may be configured to provision one or more routers in the communications network via either or both of blocks 704 and 705. In a "Initial Priority IP Communication Identification and Information Logging" block 704, device 700 may be configured to identify whether an initial priority IP communication is flagged for viral upgrade of a priority level of responsive IP communications, log flow information from the initial priority IP communication in a data structure, the flow information configured to determine responsive IP communications, and log viral upgrade priority level information in the data structure, the viral upgrade priority level configured to determine a viral upgrade priority level for the responsive IP communications.

In a "Responsive IP Communications Identification and Response-Based Upgrade" block 705, device 700 may be configured to identify the responsive IP communications flagged for response-based upgrade, identify the responsive IP communications flagged for response-based upgrade, assign a priority level to the responsive IP communications to a viral upgrade priority level associated with the priority end point device, and place the responsive IP communications in a router priority forwarding queue corresponding to the viral upgrade priority level.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

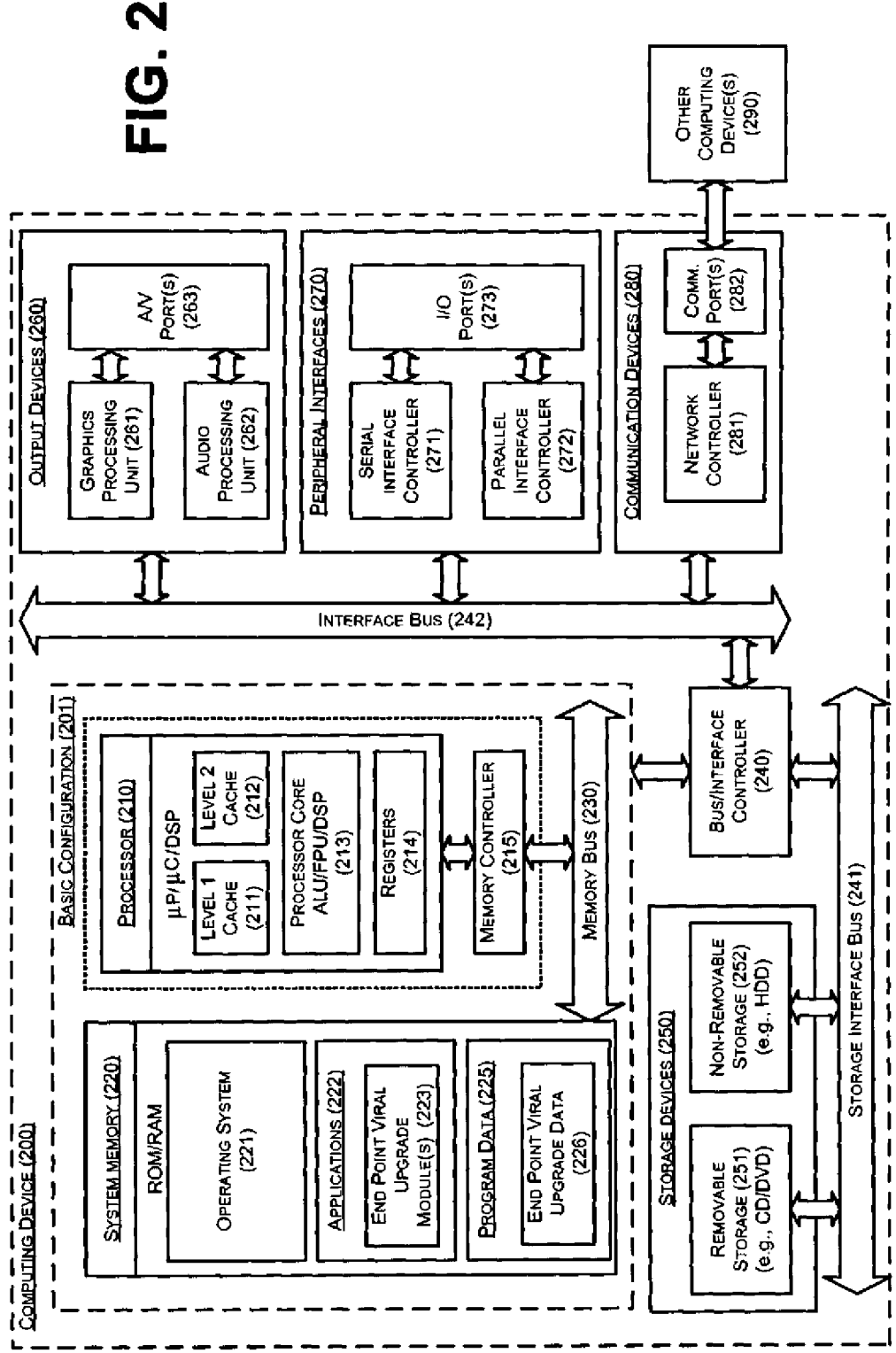

The invention claimed is:

1. A method enabling a communications network to perform viral upgrade of priority levels of Internet Protocol (IP) communications, comprising:

provisioning a priority end point device in the communications network to set a viral upgrade flag in initial priority IP communications originating from the priority end point device, wherein provisioning the priority end point device in the communications network comprises provisioning the priority end point device to set a designated viral upgrade bit in a differentiated services field of an IP packet header of an initial priority IP communication originating from the priority end point device;

provisioning a receiving end point device in the communications network to set a response-based upgrade flag in a responsive IP communication, responsive to the initial priority IP communication originating from the priority end point device and received at the receiving end point device, wherein provisioning the receiving end point device in the communications network to set the response-based upgrade flag in the responsive IP communication comprises provisioning the receiving end point device with an end point viral upgrade module configured to:

identify that the designated viral upgrade bit is set in the differentiated services field of the IP packet header of the received initial priority IP communication; and when the designated viral upgrade bit is set, to flag the responsive IP communication for response-based upgrade by setting a designated response upgrade bit in a differentiated services field of an IP packet header of the responsive IP communication, wherein the designated response upgrade bit comprises a different designated bit within the differentiated services field than the designated viral upgrade bit; and provisioning a router in the communications network to:

identify, in response to receiving the initial priority IP communication at the router, that the initial priority IP communication is flagged for viral upgrade of a priority level of responsive IP communications, by checking the designated viral upgrade bit in the differentiated services field of the IP packet header of the initial priority IP communication;

when the designated viral upgrade bit is set in the differentiated services field of the IP packet header of the initial priority IP communication, log flow information comprising a flow label from the IP packet header of the initial priority IP communication in a viral upgrade data structure;

when the designated viral upgrade bit is set in the differentiated services field of the IP packet header of the initial priority IP communication, log viral upgrade priority level information in the viral upgrade data structure, wherein the viral upgrade priority level information comprises a priority level of the initial priority IP communication;

place the initial priority IP communication in a router priority forwarding queue corresponding to the viral upgrade priority level;

identify, in response to receiving the responsive IP communication at the router, that the responsive IP communication is flagged for response-based upgrade, by checking the designated response upgrade bit in the differentiated services field of the IP packet header of the responsive IP communication;

when the designated response upgrade bit is set in the differentiated services field of the IP packet header of the responsive IP communication, look up flow information from the responsive IP communication in the viral upgrade data structure;

when flow information from the responsive IP communication is found in the viral upgrade data structure, assign the logged viral upgrade priority level of the initial priority IP communication, as logged in the viral upgrade data structure, to the responsive IP communication; and place the responsive IP communication in a router priority forwarding queue corresponding to the assigned viral upgrade priority level.

2. The method of claim 1, wherein provisioning the priority end point device in the communications network comprises activating an end point viral upgrade module within the priority end point device.

3. The method of claim 1, wherein provisioning the router further comprises provisioning the router to log a time of the initial priority IP communication in the viral upgrade data structure, and to remove data older than a predetermined age from the viral upgrade data structure.

4. A non-transitory computer readable storage medium having computer executable instructions executable by a processor, the instructions that, when executed by the processor, enable a communications network to perform viral upgrade of priority levels of Internet Protocol (IP) communications, by causing the processor to:

provision a priority end point device in the communications network to set a viral upgrade flag in initial priority IP communications originating from the priority end point device, wherein provisioning the priority end point device in the communications network comprises provisioning the priority end point device to set a designated viral upgrade bit in a differentiated services field of an IP packet header of an initial priority IP communication originating from the priority end point device;

provision a receiving end point device in the communications network to set a response-based upgrade flag in a responsive IP communication, responsive to the initial priority IP communication originating from the priority end point device and received at the receiving end point device, wherein provisioning the receiving end point device in the communications network to set the response-based upgrade flag in the responsive IP communication comprises provisioning the receiving end point device with an end point viral upgrade module configured to:

identify that the designated viral upgrade bit is set in the differentiated services field of the IP packet header of the received initial priority IP communication; and when the designated viral upgrade bit is set, to flag the responsive IP communication for response-based upgrade by setting a designated response upgrade bit in a differentiated services field of an IP packet header of the responsive IP communication, wherein the designated response upgrade bit comprises a different designated bit within the differentiated services field than the designated viral upgrade bit; and provision a router in the communications network to:

identify, in response to receiving the initial priority IP communication at the router, that the initial priority IP communication is flagged for viral upgrade of a priority level of responsive IP communications, by checking the designated viral upgrade bit in the differentiated services field of the IP packet header of the initial priority IP communication;

when the designated viral upgrade bit is set in the differentiated services field of the IP packet header of the initial priority IP communication, log flow information comprising a flow label from the IP packet header of the initial priority IP communication in a viral upgrade data structure;

when the designated viral upgrade bit is set in the differentiated services field of the IP packet header of the initial priority IP communication, log viral upgrade priority level information in the viral upgrade data structure, wherein the viral upgrade priority level information comprises a priority level of the initial priority IP communication;

place the initial priority IP communication in a router priority forwarding queue corresponding to the viral upgrade priority level;

identify, in response to receiving the responsive IP communication at the router, that the responsive IP communication is flagged for response-based upgrade, by checking the designated response upgrade bit in the differentiated services field of the IP packet header of the responsive IP communication;

when the designated response upgrade bit is set in the differentiated services field of the IP packet header of the responsive IP communication, look up flow information from the responsive IP communication in the viral upgrade data structure;

when flow information from the responsive IP communication is found in the viral upgrade data structure, assign the logged viral upgrade priority level of the initial priority IP communication, as logged in the viral upgrade data structure, to the responsive IP communication; and place the responsive IP communication in a router priority forwarding queue corresponding to the assigned viral upgrade priority level.

5. The non-transitory computer readable storage medium of claim 4, wherein provisioning the priority end point device in the communications network comprises activating an end point viral upgrade module within the priority end point device.

6. The non-transitory computer readable storage medium of claim 4, wherein provisioning the router further comprises provisioning the router to log a time of the initial priority IP communication in the viral upgrade data structure, and to remove data older than a predetermined age from the viral upgrade data structure.

7. A computing device configured to enable a communications network to perform viral upgrade of priority levels of Internet Protocol (IP) communications, comprising:

a processor;

a memory; and an end point viral upgrade module in the memory and executable by the processor, wherein the end point viral upgrade module is configured to:

provision a priority end point device in the communications network to set a viral upgrade flag in initial priority IP communications originating from the priority end point device, wherein provisioning the priority end point device in the communications network comprises provisioning the priority end point device to set a designated viral upgrade bit in a differentiated services field of an IP packet header of an initial priority IP communication originating from the priority end point device;

provision a receiving end point device in the communications network to set a response-based upgrade flag in a responsive IP communication, responsive to the initial priority IP communication originating from the priority end point device and received at the receiving end point device, wherein provisioning the receiving end point device in the communications network to set the response-based upgrade flag in the responsive IP communication comprises provisioning the receiving end point device with an end point viral upgrade module configured to:
- identify that the designated viral upgrade bit is set in the differentiated services field of the IP packet header of the received initial priority IP communication; and
- when the designated viral upgrade bit is set, to flag the responsive IP communication for response-based upgrade by setting a designated response upgrade bit in a differentiated services field of an IP packet header of the responsive IP communication, wherein the designated response upgrade bit comprises a different designated bit within the differentiated services field than the designated viral upgrade bit; and provision a router in the communications network to:
- identify, in response to receiving the initial priority IP communication at the router, that the initial priority IP communication is flagged for viral upgrade of a priority level of responsive IP communications, by checking the designated viral upgrade bit in the differentiated services field of the IP packet header of the initial priority IP communication;
- when the designated viral upgrade bit is set in the differentiated services field of the IP packet header of the initial priority IP communication, log flow information comprising a flow label from the IP packet header of the initial priority IP communication in a viral upgrade data structure;
- when the designated viral upgrade bit is set in the differentiated services field of the IP packet header of the initial priority IP communication, log viral upgrade priority level information in the viral upgrade data structure, wherein the viral upgrade priority level information comprises a priority level of the initial priority IP communication;
- place the initial priority IP communication in a router priority forwarding queue corresponding to the viral upgrade priority level;
- identify, in response to receiving the responsive IP communication at the router, that the responsive IP communication is flagged for response-based upgrade, by checking the designated response upgrade bit in the differentiated services field of the IP packet header of the responsive IP communication;
- when the designated response upgrade bit is set in the differentiated services field of the IP packet header of the responsive IP communication, look up flow information from the responsive IP communication in the viral upgrade data structure;
- when flow information from the responsive IP communication is found in the viral upgrade data structure, assign the logged viral upgrade priority level of the initial priority IP communication, as logged in the viral upgrade data structure, to the responsive IP communication; and
- place the responsive IP communication in a router priority forwarding queue corresponding to the assigned viral upgrade priority level.

8. The computing device of claim 7, wherein provisioning the priority end point device in the communications network comprises activating an end point viral upgrade module within the priority end point device.

9. The computing device of claim 7, wherein provisioning the router further comprises provisioning the router to log a time of the initial priority IP communication in the viral upgrade data structure, and to remove data older than a predetermined age from the viral upgrade data structure.

10. A method enabling a communications network to perform viral upgrade of priority levels of Internet Protocol (IP) communications, comprising:
- provisioning a priority end point device in the communications network to set a viral upgrade flag in initial priority IP communications originating from the priority end point device, wherein provisioning the priority end point device in the communications network comprises provisioning the priority end point device to set a designated viral upgrade bit in a differentiated services field of an IP packet header of an initial priority IP communication originating from the priority end point device; and
- provisioning a receiving end point device in the communications network to set a response-based upgrade flag in a responsive IP communication, responsive to the initial priority IP communication originating from the priority end point device and received at the receiving end point device, wherein provisioning the receiving end point device in the communications network to set the response-based upgrade flag in the responsive IP communication comprises provisioning the receiving end point device with an end point viral upgrade module configured to:
  - identify that the designated viral upgrade bit is set in the differentiated services field of the IP packet header of the received initial priority IP communication; and
  - when the designated viral upgrade bit is set, to flag the responsive IP communication for response-based upgrade by setting a designated response upgrade bit in a differentiated services field of an IP packet header of the responsive IP communication, wherein the designated response upgrade bit comprises a different designated bit within the differentiated services field than the designated viral upgrade bit.

11. The method of claim 10, further comprising provisioning a router in the communications network to:
- identify, in response to receiving the initial priority IP communication at the router, that the initial priority IP communication is flagged for viral upgrade of a priority level of responsive IP communications, by checking the designated viral upgrade bit in the differentiated services field of the IP packet header of the initial priority IP communication;
- when the designated viral upgrade bit is set in the differentiated services field of the IP packet header of the initial priority IP communication, log flow information comprising a flow label from the IP packet header of the initial priority IP communication in a viral upgrade data structure; and
- place the initial priority IP communication in a router priority forwarding queue.

12. The method of claim 11, further comprising provisioning the router in the communications network to:
- identify, in response to receiving the responsive IP communication at the router, that the responsive IP communication is flagged for response-based upgrade, by checking the designated response upgrade bit in the differentiated services field of the IP packet header of the responsive IP communication;

when the designated response upgrade bit is set in the differentiated services field of the IP packet header of the responsive IP communication, look up flow information from the responsive IP communication in the viral upgrade data structure;

when flow information from the responsive IP communication is found in the viral upgrade data structure, place the responsive IP communication in a router priority forwarding queue.

13. A method enabling a communications network to perform viral upgrade of priority levels of Internet Protocol (IP) communications, comprising provisioning a router in the communications network to:

identify, in response to receiving an initial priority IP communication at the router, that the initial priority IP communication is flagged for viral upgrade of a priority level of responsive IP communications, by checking a designated viral upgrade bit in the differentiated services field of the IP packet header of the initial priority IP communication;

when the designated viral upgrade bit is set in the differentiated services field of the IP packet header of the initial priority IP communication, log flow information comprising a flow label from the IP packet header of the initial priority IP communication in a viral upgrade data structure;

when the designated viral upgrade bit is set in the differentiated services field of the IP packet header of the initial priority IP communication, log viral upgrade priority level information in the viral upgrade data structure, wherein the viral upgrade priority level information comprises a priority level of the initial priority IP communication;

place the initial priority IP communication in a router priority forwarding queue corresponding to the viral upgrade priority level;

identify, in response to receiving a responsive IP communication at the router, that the responsive IP communication is flagged for response-based upgrade, by checking the designated response upgrade bit in the differentiated services field of the IP packet header of the responsive IP communication;

when the designated response upgrade bit is set in the differentiated services field of the IP packet header of the responsive IP communication, look up flow information from the responsive IP communication in the viral upgrade data structure;

when flow information from the responsive IP communication is found in the viral upgrade data structure, assign the logged viral upgrade priority level of the initial priority IP communication, as logged in the viral upgrade data structure, to the responsive IP communication; and place the responsive IP communication in a router priority forwarding queue corresponding to the assigned viral upgrade priority level.

* * * * *

UNITED STATES PATENT AND TRADEMARK OFFICE
CERTIFICATE OF CORRECTION

PATENT NO. : 8,897,244 B2
APPLICATION NO. : 13/580648
DATED : November 25, 2014
INVENTOR(S) : Gilder It is certified that error appears in the above-identified patent and that said Letters Patent is hereby corrected as shown below:

On the Title Page

On Page 2, Item (56), under "OTHER PUBLICATIONS", in Column 2, Line 7, delete "et al;" and insert -- et al.; --, therefor.

On Page 2, Item (56), under "OTHER PUBLICATIONS", in Column 2, Line 12, delete "et al;" and insert -- et al.; --, therefor.

In the Drawings

In the drawing sheet, consisting of Fig. 2, should be deleted to be replaced with the drawing sheet, consisting of Fig. 2, as shown on the attached page.

In the Specification,

In Column 1, Lines 6-8, delete "Priority is........Dec. 28, 2010." and insert -- The present application is a U.S. national stage filing under 35 U.S.C. §371 of International Application No. PCT/US10/62248, filed on Dec. 28, 2010, the entire contents of which are incorporated herein by reference. --, therefor.

In Column 1, Line 23, delete "DiffSery" and insert -- DiffServ --, therefor.

In Column 16, Line 1, delete "and or" and insert -- and/or --, therefor.

Signed and Sealed this
Twenty-eighth Day of April, 2015

Michelle K. Lee
*Director of the United States Patent and Trademark Office*